Feb. 28, 1939.  V. H. PAVLECKA  2,148,959
INTERNAL HEXAGONAL STOP NUT AND METHOD OF MAKING SAME
Filed Jan. 31, 1938
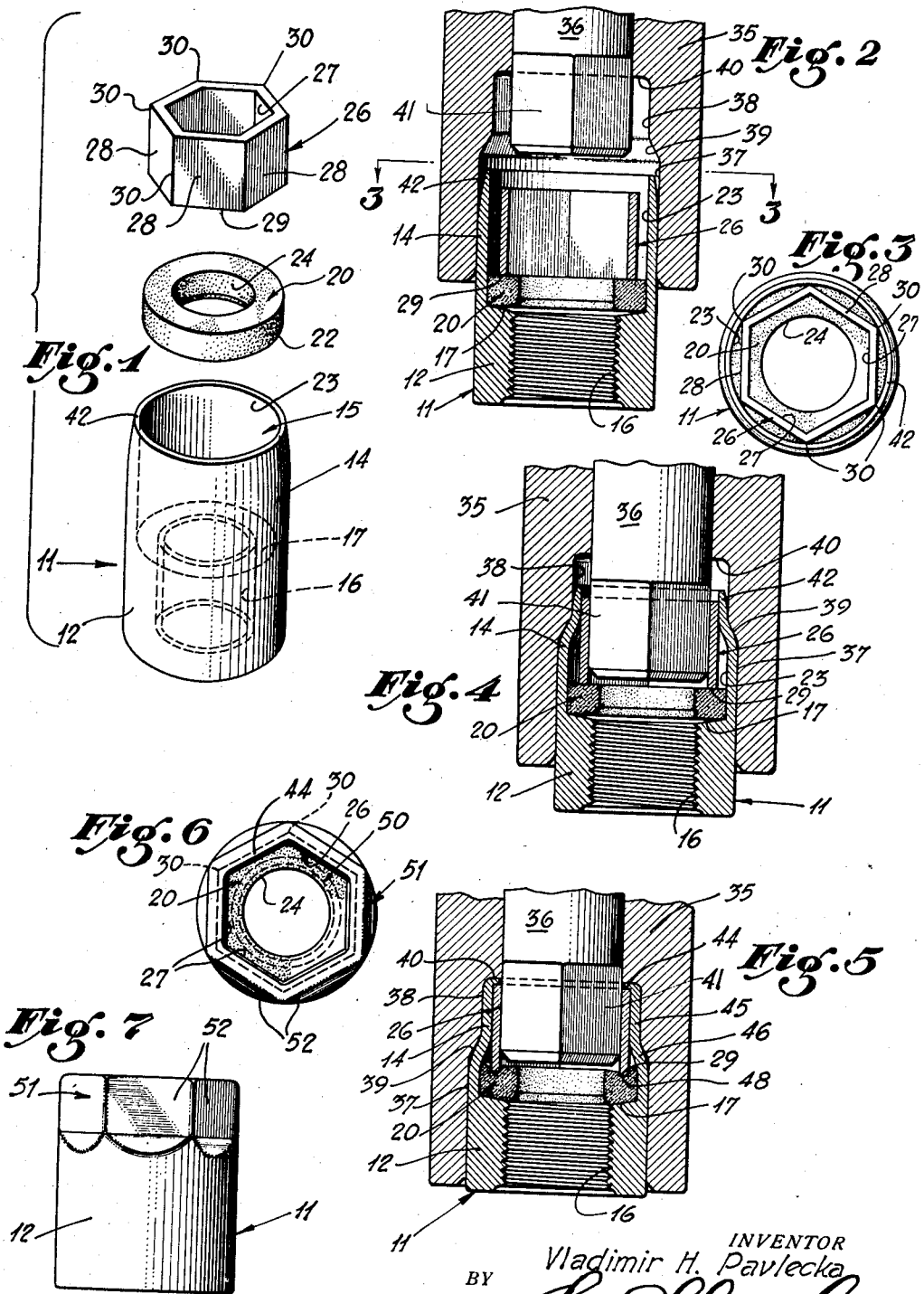
INVENTOR
Vladimir H. Pavlecka
BY
ATTORNEY Patented Feb. 28, 1939

2,148,959

UNITED STATES PATENT OFFICE 2,148,959

INTERNAL HEXAGONAL STOP NUT AND METHOD OF MAKING SAME

Vladimir H. Pavlecka, Santa Monica, Calif., assignor to Douglas Aircraft Company, Inc., Santa Monica, Calif., a corporation of Delaware Application January 31, 1938, Serial No. 187,876

9 Claims. (Cl. 10—86)

My invention relates to self-locking nuts of the type generally referred to as elastic stop nuts which include an elastic ring, such as a fiber ring, secured at one end of the threaded opening of the nut in a position to be engaged by the screw or threaded member which is screwed through the nut. The general art to which my invention appertains is well illustrated by the patents to Rennerfelt, No. 1,550,282, Self locking nut, issued August 18, 1925; Rennerfelt, No. 1,726,628, Self locking nut, issued September 3, 1929; Rennerfelt, No. 1,729,012, Self locking nut, issued September 24, 1929, and Simmonds, No. 2,102,489, Self locking nut and method of making the same, issued December 14, 1937.

My invention has for its general object the provision of an elastic stop nut which has a polygonal socket so that it may be screwed onto and off of the screw member with which it cooperates by means of a socket wrench.

It is an object of my invention to provide an elastic stop nut in which the elastic member is immovably secured in proper position with relation to other parts of the nut so that there will be no danger of the elastic member rotating with relation to the nut or being axially displaced by the screw.

It is a further object of my invention to provide an elastic stop nut in which a polygonal tubular member and elastic ring are secured in a cavity adjacent the threaded opening of the nut, and in which the polygonal tubular member is secured in place by forming a wall of the nut around the polygonal tubular member and by forming an inwardly projecting flange which engages the end of the polygonal tubular member.

It is a further object of my invention to provide an internal polygonal elastic nut in which a body which has the threaded opening has a wall formed or swedged around a polygonal tubular member and securely grips and reinforces the same against deformation when a socket wrench is applied thereto for rotating the same, and in which the elastic ring is immovably secured in place between a shoulder of the body and one end of the polygonal tubular member.

It is a further object of my invention to provide an internal polygonal elastic stop nut in which the wall of the body is swedged into polygonal cross-section and is reinforced against deformation by the body at one end of the wall and by a flange formed at the other end of the wall, the body and flange providing a beam effect which resists the deformation.

It is a further object of my invention to provide an elastic stop nut which has both an internal and an external polygonal portion so that either an external or socket wrench may be used in turning the nut.

It is a still further object of my invention to provide a simple and improved method of manufacturing an elastic stop nut which is positive in its various steps and which will result in the production of relatively few rejectable nuts.

It is a still further object of my invention to provide a method of making an elastic stop nut in which a polygonal tubular member which forms the polygonal socket of the nut is forced into engagement with the elastic ring to securely hold the same immovable relative to other parts of the nut.

It is a still further object of my invention to provide a method of forming an elastic stop nut having both an internal and an external polygonal portion in which a blank is formed consisting of a body having a threaded opening and a wall projecting therefrom providing a cavity in which an elastic ring and a polygonal tubular member are placed in the cavity, and in which the wall is swedged or deformed around the polygonal tubular member in order to securely grip the polygonal tubular member so that it will be immovable relative to the blank and in order that the elastic ring will be immovably secured coaxial to and at one end of the threaded opening.

Other objects and advantages of my invention will be brought out in the course of the following detailed description of a form of my invention which has been chosen for the purpose of illustration. It should be understood that the form of my invention to be explained in detail is only one form in which the principle of my invention may be embodied, and that by my choosing this particular embodiment to instruct those skilled in the art as to how my invention may be practiced, I do not wish to be limited thereto but wish my invention to be broadly construed in accordance with the spirit and scope of the appended claims.

Referring to the drawing in detail,

Fig. 1 illustrates three essential elements of the elastic stop nut of my invention ready to be assembled.

Fig. 2 is a quarter section of the parts illustrated in Fig. 1 in assembled position and shows a forming tool ready to form the parts.

Fig. 3 is a plan view of the three parts of my invention assembled as shown in Fig. 2.

Fig. 4 is a view resembling Fig. 2 but showing the forming tool in a partly depressed position, and showing the upper wall of the blank partly formed.

Fig. 5 is a sectional view corresponding to Figs. 2 and 4 but showing the forming tool at the completion of its forming operation, and showing the elastic stop nut of my invention as completed.

Fig. 6 is a plan view of the elastic stop nut illustrated in Fig. 5.

Fig. 7 is an elevational view.

Referring to the drawing in detail, the numeral 60

11 represents a blank which has a body portion 12 and an annular or cylindrical wall 14 extending from one end thereof and providing a cavity 15. The body 12 has a threaded opening 16, and formed at the end of the body and at the bottom of the cavity 15 is an annular shoulder 17 which is slightly bevelled, as shown clearly in Figs. 2, 4, and 5. To enable the wall 14 to be readily worked at its upper end, the wall is slightly tapered, as shown. The numeral 20 represents an elastic member which is in the form of a ring having an outer cylindrical surface 22 which is of substantially the same diameter as the inner surface 23 of the wall 14 so that when the elastic ring is placed in the cavity 15 it will be supported in a position coaxial to the threaded opening 16. The elastic ring 20 has a cylindrical hole 24 which is of smaller diameter than the screw member or threaded member on which the nut is to be used.

The elastic member 20 may be made from any suitable elastic material, and preferably fiber, but it may also be made from other elastic or cushion materials which are well known on the market.

The numeral 26 represents a tubular member which is internally polygonal so as to provide wrench-engaging shoulders 27, and in the preferred form of my invention the tubular member 26 is also externally polygonal so as to provide external shoulders 28. In the preferred form of my invention the tubular member 26 is hexagonal in view of the fact that it is common practice in the various industries to provide hexagonal socket wrenches.

After forming the blank 11, the elastic ring 20, and the polygonal tubular member 26, the parts are then assembled as illustrated in Fig. 2. The elastic ring 20 is first placed in the cavity 15 in engagement with at least the outer peripheral portion of the annular shoulder 17. The polygonal tubular member 26 is placed in the cavity above the elastic ring with the lower end 29 thereof in engagement with the upper surface of the elastic ring 20. In the preferred form of my invention the corners 30 of the polygonal tubular member 26 are formed on the same diameter as the inner surface 23 so that when the member 26 is placed in the cavity 15 engagement of the corners 30 and the surface 23 will centralize the polygonal tubular member 26 so that it will be coaxial to the threaded opening 16.

After thus assembling the parts, the next operation is to form or swedge the cylindrical wall 14 from its original cylindrical shape, as illustrated in Figs. 1, 2, and 3, into its final form, as illustrated in Figs. 5 and 6. For this purpose I employ a forming tool which includes a forming member 35 and a floating mandrel 36. The forming member includes a cavity which provides a lower cylindrical portion defined by a wall 37, an upper polygonal portion defined by a wall 38 which in this form of the invention is hexagonal, and an intermediate tapered portion defined by a tapered wall 39. At the upper end of the hexagonal portion of the cavity is an end wall 40. The mandrel 36 has a polygonal portion 41 which is of a cross-sectional size to be slidable into the polygonal tubular member 26.

In the forming operation the first step is to move the floating mandrel 36 downwardly into a position within the polygonal tubular member 26 as it is shown in Figs. 4 and 5. The next step is to move the forming member 35 downwardly. As the forming member is moved downwardly the upper end of the wall 14 is engaged by the tapered wall 39 and swedged inwardly, as illustrated in Fig. 4. When the upper end of the cylindrical wall 14 is engaged there are resulting forces in an inward direction tending to swedge the wall inwardly and also in a downward direction. In order to prevent deformation of the cylindrical wall 14 at a point below the tapered wall 39, the cylindrical wall 37 is made sufficiently long so that at the commencement of the swedging or forming operation the entire cylindrical wall 14 is enclosed and any tendency to deform will be resisted. As the forming member moves downwardly the cylindrical wall 14 is first deflected inwardly by the tapered wall 39 and then passes into the hexagonal section of the cavity and is further deformed by the hexagonal wall 38. As the forming member approaches the lower end of its stroke the extreme upper end 42 of the cylindrical wall 14 is engaged by the end wall 40 and is turned inwardly and forms an inwardly projecting flange 44 at the upper end of the cylindrical wall 14, which flange is in engagement with the upper end of the polygonal tubular member 26. By this forming operation the cylindrical wall 14 is deformed from cylindrical shape so that the upper part thereof comprises a polygonal section 45 which is connected to the body 12 by the tapering section 46 of the cylindrical wall 14. It will furthermore be seen that the polygonal tubular member 26 is forced downwardly so that the elastic ring 20 is forced against the shoulder 17 and so that the lower end 20 forms a polygonal recess 48 in the upper part of the elastic ring 20.

By reason of the deforming or swedging of the cylindrical wall 14 into polygonal shape, the external shoulders 28 of the polygonal tubular member 26 are securely gripped, with the result that the member 26 is rigidly connected to the wall 14 and body 12 so that these parts are immovable with relation to each other. By forcing the member 26 downwardly so as to grip the elastic member 20 and form the polygonal recess 48 in the upper part thereof, the elastic ring is securely gripped so that it in turn is immovable with respect to other parts of the nut.

The polygonal portion 45 reinforces the polygonal tubular member 26 against deformation when a socket wrench is applied thereto and the portion 45 is restrained from deformation by means of the body 12 which is connected thereto through the tapered wall 46 at one end thereof and by means of the inwardly projecting flange 44 which is connected to the end of the polygonal portion 45 opposite from the body 12. The flange 44 also cooperates to resist upward displacement of the polygonal tubular member 26 relative to the wall 14.

The nut when completed provides an internal polygonal socket shown at 50 in Fig. 6 which provides shoulders 27 engageable by a socket wrench. The portion 45 presents an external polygonal portion indicated at 51 in Fig. 6 which provides external shoulders 52 which are engageable by an ordinary wrench. It will therefore be seen that although my invention is primarily intended as an internal polygonal elastic stop nut, it is also an external polygonal elastic stop nut and may be used where either type of stop nut is desired.

It is believed that the advantages of my invention are readily apparent from the foregoing description and that it will at once be recognized that the elastic stop nut of my invention is simple and rugged in construction, and that the method of manufacture is of the utmost simplicity and will result in the production of a relatively small number of rejectable stop nuts.

I claim as my invention:

1. In a self-locking nut of the class described, the combination including: a body having a threaded opening and a shoulder at one end of said threaded opening; an integral wall extending from said body; a polygonal tubular member within said wall and being gripped thereby; and an elastic ring secured between said shoulder and the inner end of said polygonal tubular member, said elastic ring having a hole substantially co-axial to said threaded opening, which hole is of smaller diameter than the diameter of the screw on which said nut is used.

2. In a self-locking nut of the class described, the combination including: a body having a threaded opening and a shoulder at one end of said threaded opening; an integral wall extending from said body; a polygonal tubular member within said wall and being gripped thereby; an inwardly projecting flange at the end of said wall in engagement with the end of said polygonal tubular member; and an elastic ring secured between said shoulder and the inner end of said polygonal tubular member, said elastic ring having a hole substantially coaxial to said threaded opening, which hole is of smaller diameter than the diameter of the screw on which said nut is used.

3. In a self-locking nut of the class described, the combination including: a body having a threaded opening and a shoulder at one end of said threaded opening; an integral wall extending from said body; a polygonal tubular member within said wall, said polygonal tubular member being both internally and externally polygonal, and said wall conforming to and grippingly engaging the exterior of said polygonal tubular member; and an elastic ring secured between said shoulder and the inner end of said polygonal tubular member, said elastic ring having a hole substantially coaxial to said threaded opening, which hole is of smaller diameter than the diameter of the screw on which said nut is used.

4. In a self-locking nut of the class described, the combination including: a body having a threaded opening and a shoulder at one end of said threaded opening; an integral wall extending from said body; a polygonal tubular member within said wall, said polygonal tubular member being both internally and externally polygonal, and said wall conforming to and grippingly engaging the exterior of said polygonal tubular member; an inwardly projecting flange at the end of said wall in engagement with the end of said polygonal tubular member; and an elastic ring secured between said shoulder and the inner end of said polygonal tubular member, said elastic ring having a hole substantially coaxial to said threaded opening, which hole is of smaller diameter than the diameter of the screw on which said nut is used.

5. In a self-locking nut of the class described, the combination including: a body having a threaded opening and a shoulder at one end; an integral wall extending from said body; a tubular member having internal wrench-engaging shoulders, said wall conforming to and gripping the exterior of said tubular member to hold same immovable relative to said wall and said body; and an elastic ring secured between said shoulder and the inner end of said tubular member, said elastic ring having a hole substantially coaxial to said threaded opening, which hole is of smaller diameter than the diameter of the screw on which said nut is used.

6. In a self-locking nut of the class described, the combination including: a body having a threaded opening and a shoulder at one end; an integral wall extending from said body; a tubular member having internal wrench-engaging shoulders, said wall conforming to and gripping the exterior of said tubular member to hold same immovable relative to said wall and said body; an inwardly projecting flange at the end of said wall in engagement with said tubular member; and an elastic ring secured between said shoulder and the inner end of said tubular member, said elastic ring having a hole substantially coaxial to said threaded opening, which hole is of smaller diameter than the diameter of the screw on which said nut is used.

7. In a self-locking nut of the class described, the combination including: a body having a threaded opening, a wall extending from the main portion of the body, a cavity within said wall, and a shoulder between said opening and said cavity; an elastic member at said shoulder having a hole of less diameter than the diameter of the screw on which the nut is used; a polygonal tubular member positioned in said cavity in engagement with said elastic member, said wall being formed to grip said polygonal tubular member to secure same in said cavity and in a position to grip said elastic member between said shoulder and the inner end of said polygonal tubular member.

8. In a method of forming a self-locking nut, the steps including: forming a blank which has a body having a threaded opening and an annular wall forming a cavity at the end of said body; placing in the bottom of said cavity an elastic ring which has a hole which is substantially coaxial to said threaded opening, said hole being smaller in diameter than the diameter of the screw on which the nut is used; placing a polygonal tubular member in said cavity above said elastic ring; and forming said wall around said polygonal tubular member to secure same in said cavity and to hold same in gripping relation to said elastic ring to hold all of said parts immovable relative to each other.

9. In a method of forming a self-locking nut, the steps including: forming a blank which has a body having a threaded opening and an annular wall forming a cavity at the end of said body; placing in the bottom of said cavity an elastic ring which has a hole which is substantially coaxial to said threaded opening, said hole being smaller in diameter than the diameter of the screw on which the nut is used; placing a polygonal tubular member in said cavity above said elastic ring, which tubular polygonal member is both internally and externally polygonal; and forming said wall around said polygonal tubular member to form same into a polygonal shape with internal shoulders in gripping engagement with the exterior of said polygonal tubular member so as to secure same in said cavity and to hold same in gripping relation to said elastic ring to hold all of said parts immovable relative to each other.

VLADIMIR H. PAVLECKA.